United States Patent [19]

Davey

[11] 4,356,033
[45] Oct. 26, 1982

[54] PROCESS FOR REFINING METALS BY DROSSING PROCEDURES

[76] Inventor: Thomas R. A. Davey, 5 Rhodes Dr., Glen Waverley, Victoria, Australia

[21] Appl. No.: 158,131

[22] Filed: Jun. 10, 1980

[51] Int. Cl.³ .................. C22B 13/06; C22B 25/08
[52] U.S. Cl. ........................................ 75/63; 75/78;
          75/79; 75/85; 75/24; 75/83; 75/28; 75/72
[58] Field of Search ................ 75/78, 79, 85, 24, 63,
          75/28, 72, 83; 266/93, 68 R, 76, 227–231

[56]            References Cited
          U.S. PATENT DOCUMENTS 1,853,541  4/1932  Betterton ............................... 75/79
2,363,127 11/1944  Graves .................................... 75/85
2,434,105  1/1948  Fleming et al. ....................... 266/228
3,676,105  7/1972  McLeod et al. ...................... 75/68 R
3,923,499 12/1975  Manthey et al. ........................ 75/78
3,979,108  9/1976  Nagasaki et al. ....................... 75/24
4,191,559  3/1980  Van Linden et al. .................. 75/24

Primary Examiner—M. J. Andrews
Attorney, Agent, or Firm—Larson and Taylor

[57]            ABSTRACT

A process for refining metals, such as lead and tin, by removal of impurities as a dross or crust, in which a cooling medium is applied to the surface of a melt of the metal and, simultaneously with cooling, stirring the melt.

14 Claims, 4 Drawing Figures

PROCESS FOR REFINING METALS BY DROSSING PROCEDURES

This invention relates to an improved method for removing impurities from metals, such as silver and gold from lead or iron from tin, whereby the impurity is precipitated from solution in the metal by cooling, with or without prior addition of reagents to the metal, and skimming or otherwise removing the impurity from the metal bath in the form of a dross or crust.

In such processes it is frequently advantageous to conduct the refining operation in at least two stages, so that the dross or crust containing the impurity is removed from a bath of the molten metal in the first stage, conducted at a relatively higher temperature, and dross which is removed from the second stage, at a lower temperature, is recycled to the first stage of a subsequent batch of metal to be refined. By this means the second-stage dross, containing a substantially lower concentration of impurity than the first-stage dross, is up-graded by liquation and/or reaction in the first stage, so that a lesser quantity must be removed for recovery of valuable impurities as by-products, or for recycling to an earlier stage of the metal recovery process.

One such process is the two-stage removal of iron from tin in which after removal of tin-iron dross at a temperature somewhat over 496° C., the tin is cooled to a temperature somewhat above the tin melting point of 232° C., and the dross formed in this cooling stage is returned for liquation to the high-temperature stage of the next batch of tin. The present invention enables significant improvement of this process, in particular in the second stage thereof.

Among such process is the well-known Parkes process, whereby zinc is stirred into the silver-containing lead, in order to form a zinc-silver alloy which is solid and floats to the surface of the lead bath, from which it may be skimmed and sent to a plant for recovery of its valuable metal constituents.

The Parkes process consumes zinc, labor, fuel for heating the lead kettle, a great deal of time, but relatively little electrical power for stirrers, pumps and blowers, and requires relatively little maintenance. The many variations of the process which are practised reflect a desire to optimise the balance of all these cost factors, and may also be affected by the level of silver (and possibly of gold and copper) in the lead to be treated, and especially by whether the input lead is of a relatively constant composition, or very variable.

In general, the Parkes process is operated in two stages, whereby zinc is stirred into the lead in the second stage, the lead is cooled and the resulting poor crust (relatively low in silver content) is removed from the lead and returned to the first stage of treatment of the next batch of lead. After stirring the poor crust into this next batch of lead, a rich crust (relatively high in silver content, and with a relatively low zinc/silver ratio) is removed from the lead bath for recovery of its silver, zinc and lead contents.

The amount of rich crust removed can vary somewhat according to the silver content of lead to be treated and the method of working, but can be expected to be of the order of 3% of the lead weight. The amount of poor crust from the second stage varies greatly according to the method of working, but is generally in the range of 7–20% of the lead weight, and may be even more. The labour of skimming this poor crust from the lead is considerable, and a prime objective of the present invention is to eliminate this arduous labour completely. It is also standard practice in many plants to scrape the kettle sides free from adhering zinc-silver alloy crystals during the cooling period of the second stage, and this labour is likewise eliminated by the present invention.

In order to reduce the amount of labour associated with the second crust skimming, some desilverising procedures involve the addition of some new zinc to the first stage (as well as the poor crust) and/or the cooling of the lead bath while skimming the first crust, so as to leave less silver in the lead after the first stage. Both of these procedures involve additional costs as compared with the method of the present invention: increased zinc consumption for the former, and increased treatment time and fuel costs for the latter. The present invention enables a two-stage batch desilverising process to be carried out with close to the minimum theoretical zinc and fuel consumptions, with a minimum of labour for skimming crust, and a minimum time cycle of treatment—i.e. maximum throughput capacity of a desilversing kettle. The electrical power consumption is increased somewhat, but still constitutes a very small fraction of the total costs. The maintenace costs for kettle replacement are also reduced.

The invention achieves such advantages by providing, in a process for removing an inpurity metal as a dross or crust from a metal melt, the steps of cooling the surface of the melt and simultaneously stirring the melt, either continuously or intermittently.

This method of rapid cooling contrasts with the present customary procedures. In the Parkes process the customary procedures may involve simply slow cooling by radiation and convection from the kettle surface and furnace setting, or may be accelerated somewhat by forced cold air draft through the kettle setting, or even by intermittently hosing water on to the lead surface, followed by manual agitation to redissolve the solid leady masses so formed—requiring a good deal of arduous labor.

Slow cooling is doubly disadvantageous because not only does it require a long time, but also the zinc consumption is higher than with rapid cooling, due to the longer time for interaction between precipitates already formed and the molten bath. Increasing the cooling rate by forced draft produces crusts on the kettle walls and, unless the crusts are scraped off, they can result in silver re-entering the lead bath when the treated bath is being re-heated to pump out the lead. This practice also tends to shorten kettle life by premature cracking. Direct cooling of the lead by hosing water may also cause cracking of the kettle walls, and as cooling is intermittent, it is still a rather lengthly, as well as laborious, procedure.

None of these prior procedures results in a completely homogeneous bath of lead at a uniform, low finishing temperature, so that a charge may not be completely desilverised right through even although a sample taken indicated satisfactory desilverising. The method of the invention provides the fastest practicable cooling, avoids crust formation on the kettle walls so that no re-solution occurs when heating to pump out, and produces a final bath of uniform low silver content so that off-standard compositions are completely avoided. As aforementioned, it also completely avoids the labor of skimming second-stage crusts or scraping the kettle walls, and as the crust produced has a lower than normal lead content, the kettle throughput capacity is maximised.

Similar considerations distinguish the present process from customary procedures for removal of iron from tin.

The method of the invention can be understood by reference to the accompanying drawings, in which.

Figure 1:
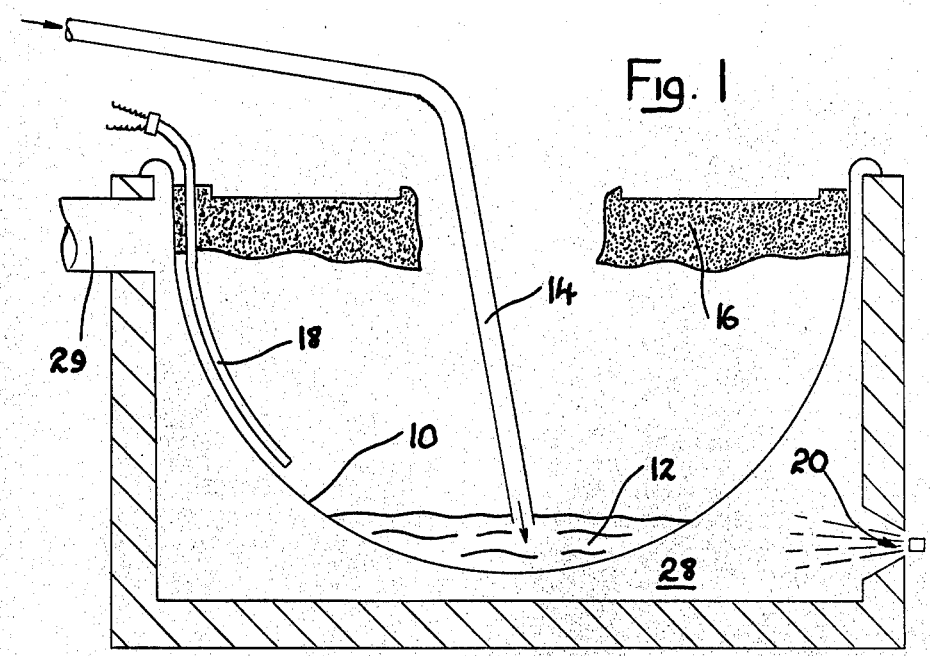
FIGS. 1 and 2 show similar sectional views of a kettle at different stages of a lead refining operation.

FIG. 1 shows lead being pumped into a kettle 10 from which the previous charge of desilverised lead has been pumped away. In order to reduce to a minimum the pump-over dross and froth, lead 12 is conducted to the bottom of kettle 10 via a pipe 14, placed through the central space in a bridge of solidified crust 16 remaining from the previous charge and containing all of the poor crust from the preceding lead charge. A thermocouple 18 is located within kettle 10 to register the temperature of the lead bath.

When kettle 10 has been filled, and the bath temperature adjusted to about 460° C., by appropriate firing in kettle setting 28 by burner 20, a stirrer is placed in position through crust 16 in readiness to stir the bath. In order to bring the crust and the bath of lead close to equilibrium, the crust is mixed into the lead by means of the stirrer for about half an hour at about 460° C.

Stirrer 22 is then removed from the kettle, and the rich crust is skimmed off in the customary manner, but without any cooling of the lead. (The lead may be cooled if desired, without departing from the spirit of the invention, but the full advantages are gained when the lead temperature is maintained substantially constant until after stirring in zinc in the second stage.)

After skimming the rich crust, zinc is added and stirred into the lead at about 460° C. for about half an hour, the quantity of zinc required being given by Table 1.

TABLE 1

| Ag, ppm | Zinc addition, as % of input lead, to produce | |
|---|---|---|
| | 10 ppm AG | 5 ppm AG |
| 1000 | 0.76 | 0.96 |
| 2000 | 0.93 | 1.13 |
| 3000 | 1.09 | 1.29 |
| 4000 | 1.24 | 1.44 |
| 5000 | 1.37 | 1.57 |
| 6000 | 1.51 | 1.71 |
| 7000 | 1.64 | 1.84 |
| 8000 | 1.76 | 1.96 |

Figure 2:
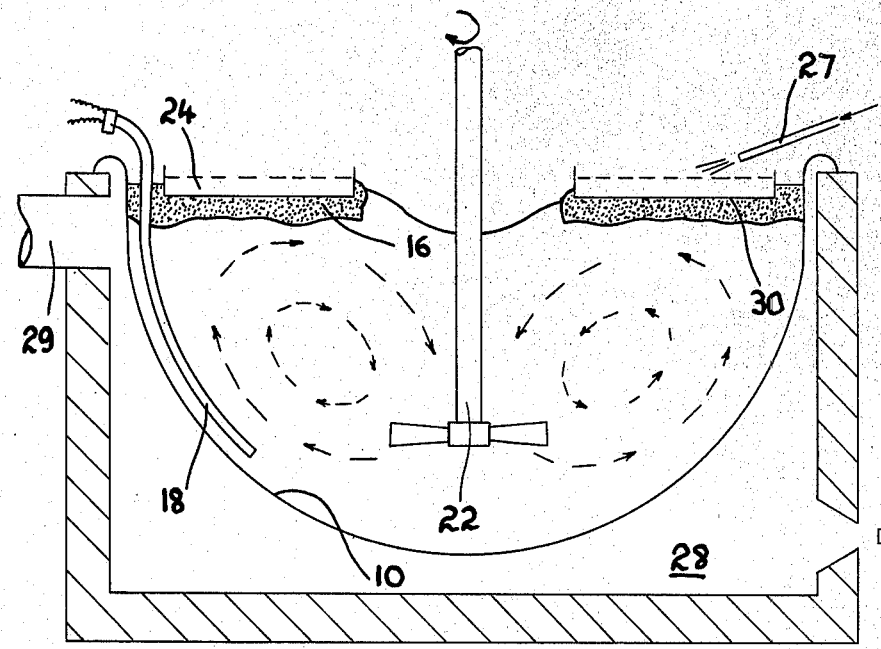

After the zinc is stirred into the lead, stirrer 22 is removed from the kettle, the cooling device 30 is placed in position, and cooling water 24 is charged to device 30 such as by hose 27. With stirrer 22 replaced in the kettle, and used to circulate the lead as shown in FIG. 2, the lead is cooled by the underside of the cooling device 30.

It has been found in practice that an efficient stirrer, such as is normally used for stirring zinc or crust into the lead, causes an excessive amount of frothy dross and, hence, oxide formation if run continuously at normal speed during this cooling period. The oxide formation can be eliminated in various ways. The normal refinery stirrer can be operated intermittently (for example, for 2-minute intervals each time the temperature falls by 10°) or by using a very low-pitch impellor. It is preferred, however, to use a normal, highly efficient refinery stirrer operating at a lower than normal speed during the cooling period.

During the cooling cycle, the oil or gas firing in the kettle setting is turned off, but no draft of cooling air is permitted to pass through furnace 28, so that no cooling of lead through the kettle walls occurs, and no crusts of zinc-silver alloy form there—obviating the need for scraping the kettle wall.

Under these stirring conditions a silver-zinc crust with a rather low lead content freezes out on the water-cooled surface of the cooling device 30. As will be apparent from the foregoing, and as shown in FIG. 2, crust 16 which is formed is a solid and substantially unitary mass. A small flow of cooling water is maintained to replenish the water lost by steaming. Cooling and stirring are continued until thermocouple 18 indicates that the lead is about to freeze. Then stirrer 22 is switched off and removed from the kettle, the water flow is stopped and cooling device 30 is lifted out, leaving the crust solified as a bridge, but with a central opening above the still liquid lead, so that a pre-heated pump may be inserted there, to pump away the desilverised lead for further refining. The kettle, containing the bridge of solid crust, as shown in FIG. 1, is then ready to receive the next charge of lead to be desilverised.

With this method of working, the cooling time of the second cycle is reduced from up to 12 hours to 2-5 hours, for a 200-250 ton kettle, and the labour of skimming second-stage crusts is entirely eliminated. The amount of second-stage crusts formed may be less than that produced by hand-skimming, so that the output per batch of desilverised lead is greater. It is clear that some second-stage crust could be skimmed by hand if desired for any reason, without departing from the spirit of this invention, but the full benefits of the procedure are gained by eliminating entirely the arduous work of skimming the second-stage crusts.

It has long been known that the last of the crusts need not be skimmed by hand, but can be left on the kettle provided that a plug is positioned in the kettle centre so that a free space is provided, on removal of the plug, for insertion of a pre-heated pump to pump away the treated lead. However, apart from the present invention, there is no method known by which the skimming of second-stage crusts can be entirely or even substantially eliminated. Essentially this method provides for cooling the upper surface of lead in the kettle while circulating the lead at a velocity sufficient to ensure that silver-zinc alloy only, with relatively little entangled lead, forms the crust at the top of the kettle.

Figure 3A:
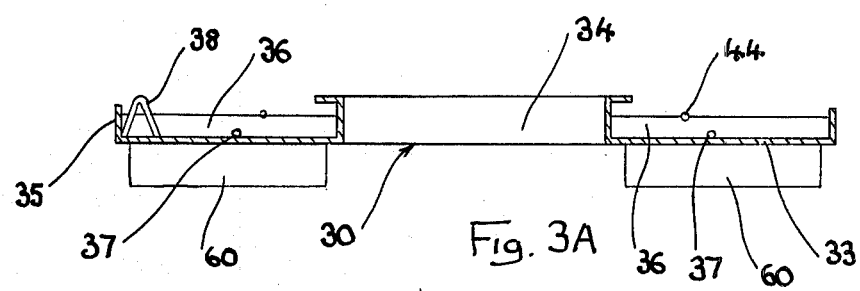
FIGS. 3A and 3B show a vertical sectional view and a plan view of a cooling device as used in the operation described in reference to FIGS. 1 and 2.
Figure 3B:
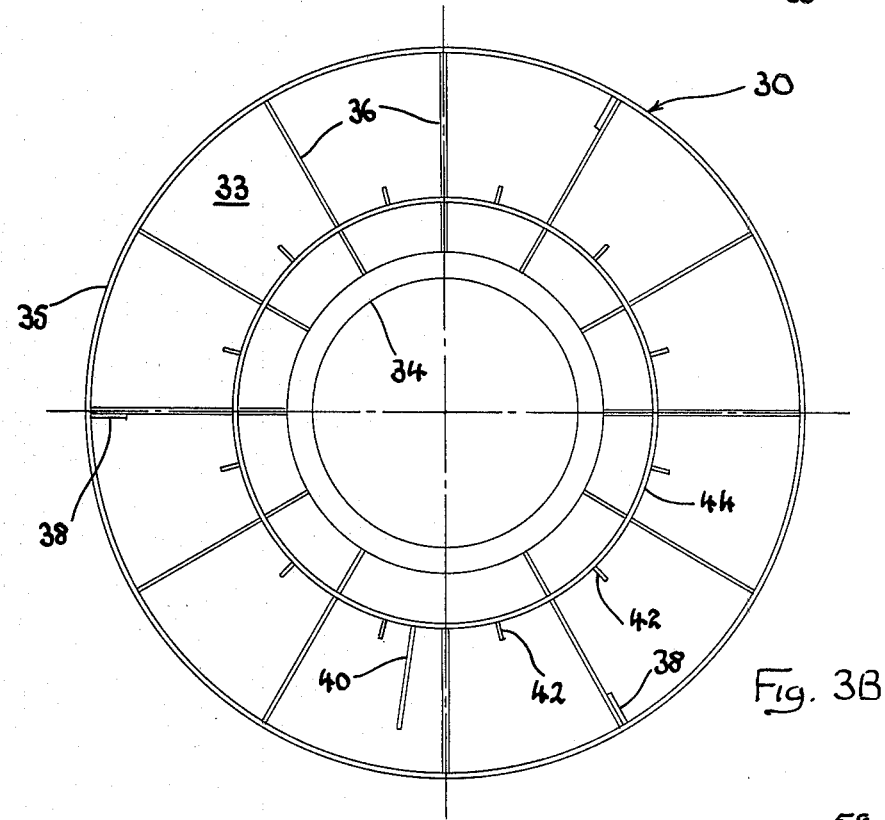

The frame 30 shown in FIGS. 3A and 3B of the accompanying drawings shows a practical way of carrying out the method of the invention, but it will be apparent to those skilled in the art that considerable variation in the details of design is possible. The preferred features are that a substantially annular area of the lead surface is cooled, and the frame is able to float on the lead bath so that it remains in contact with the lead surface as the lead contracts on cooling.

In the device 30 of FIGS. 3A and 3B, an annular trough 32 is defined by a base wall 33 and opposed peripheral walls 34, 35. Angularly spaced radial ribs 36 stiffen the overall structure, and have apertures 37 to ensure a constant water level throughout the trough.

Lifting lugs 38 at about 120° intervals enable lifting and lowering of the device in use.

When used to cool the surface of a lead or tin melt, the device should be substantially full of water to prevent distortion by contact with hot metal. Water may be supplied directly such as by means of a hose as in FIG. 2. However, it is preferred that such hose be connected to inlet pipe 40 which feeds the water to outlet spray nozzles 42 spaced angularly around a circular supply conduit 44.

The dimensions of device 30 can vary substantially. However, for a refining kettle of 4.2 meters in diameter, it is found that satisfactory performance is achieved from a device formed of 13 mm steel plate and having internal and external diameters of about 1.3 m. and 3.6 m., respectively. A depth of about 16 cm is sufficient for the device 30.

Figure 4:
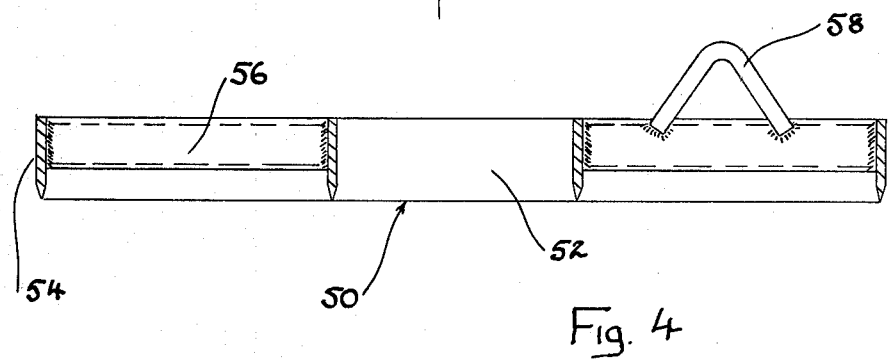
FIG. 4 is a vertical sectional view of an alternative form of cooling device.

FIG. 4 shows in vertical section an alternative cooling device 50 which enables the lead surface to be cooled by direct contact with water. It consists of inner and outer ring walls 52, 54 joined by radial members 56, here shown as rolled steel joints, but without a bottom plate. Device 50 must be supported on the lead surface by an overhead crane, engaged with lugs 58, until water has been supplied, when it will float alone as soon as a skin of lead has solidified across between the inner and outer walls. In this case the cooling water most preferably is allowed to evaporate completely before the cooling device is removed from the kettle at the end of the cycle. The cooling water most preferably is provided in a manner similar to that described in relation to FIGS. 3A and 3B.

It may be of advantage to provide radially extending ribs 60 on the underside of the cooling device 30, so as to promote radial flow of the lead, reducing the swirl, and eliminating vortexing. Swirl and vortexing, if serious, could cause dross formation and loss of zinc by oxidation. However, cooling devices without such radial ribs operate quite successfully, if the stirrer speed is chosen correctly. As shown in FIG. 3A, ribs 60 extend below base wall 33 and preferably are substantially radial; while their depth below the base may correspond substantially to the depth of the crust to be formed or be slightly greater than that depth.

Any suitable stirrer may be used for the circulation of lead, and it may or may not include a drum or sheath surrounding the impeller. The stirrer is preferably provided with a two-speed or variable-speed drive, so that the same stirrer can be used at the optimum (higher) speed for stirring zinc or crust into the lead to dissolve it, and at the optimum (lower) speed during the cooling cycle. Alternatively, two stirrers may be used for the different duties, or the same stirrer may be operated intermittently during the cooling cycle, as aforementioned. The best method, with the greatest benefits at reasonable cost, is to use a variable-speed stirrer.

The optimum speed for the stirrer during cooling depends upon the geometry of the kettle and stirrer. The greater the speed, the more rapid the cooling, and the less lead entrained in the crust. If too little lead is entrained, the crust becomes difficult to dissolve in the next batch of lead. If the stirring is too rapid, dross formation occurs, which is also undesirable. Preferably, the speed is therefore chosen so that substantially no dross forms by oxidation, the amount of lead entrained in the crust is moderately low, and the cooling period is sufficiently short.

The cooling device is dimensioned so that the central space within the annulus is a few centimeters larger in diameter than the stirrer impellor or the pump supports, and the outer ring is about 60 centimeters in diameter less than the kettle walls.

After removal of the stirrer, a plug may be inserted in the central space in the crust, if it is desired to let the kettle settle for some time before pumping out. Such practice, using a plug, is however unnecessary if the stirrer speed is correctly chosen, because practically all of the silver-zinc crystallites produced during cooling become trapped in the solid crust, and the desilverised lead may be pumped away as soon as practicable after removing the stirrer and cooling device and inserting the preheated pump.

The application to the removal of iron from tin is similar to the above, but simpler because no reagent is required to precipitate iron from tin. After removal of the first-stage dross at a temperature somewhat above 496° C., the cooling device 40 or 50 and stirrer 22 are placed in position in the kettle, and operated in the same manner as described above for desilverising of lead.

An accretion of tin-iron compound crystals in a matrix of solidified tin metal forms on the underside of the cooling device, but not on the kettle walls, which are not cooled. When the tin temperature has fallen to about 240°–250° C., stirrer 22 is switched off and removed from the kettle, the water cooling is discontinued and the cooling device 40 or 50 is removed. After several minutes standing, during which a small quantity of iron-tin crystallites settles to the bottom of the kettle, a pre-heated pump is inserted, and the refined tin is pumped out of the kettle.

The next charge of hot tin to the kettle melts the crust, enabling the dross to be removed by skimming or centrifuging, as is the customary practice.

EXAMPLE

Approximately 177 tons of softened lead containing 1510 ppm silver was transferred to a nominal 210 ton desilverising kettle, containing a crust of about 30 tons from the previous charge. The temperature was brought up to 460° C. and after stirring for about 30 minutes a rich crust of about 3 tons was removed. Then 1670 kg of zinc was added to the kettle and stirred in at 460° C. for 30 minutes. The cooling trough (with an internal diameter of 130 cm, and an external diameter of 360 cm, leaving 30 cm of free space to the kettle walls) and the stirrer, were then placed in position and the stirring/cooling was commenced. After 5 hours, the temperature of the lead had fallen to 320° C. The stirrer had three blades of 63 cm diameter, set at 10° instead of the normal 30°, to give the required gentle stirring, at 210 rpm. The stirrer and cooling trough were removed from the kettle, a pre-heated pump was inserted, and within 10 minutes the lead was being pumped away for dezincing, while the kettle was being lightly fired. 175 tons of desilverised lead was produced, with a silver content of 7 ppm.

Having now described my invention, what I claim as new and desire to secure by Letters Patent is:

1. A process of removing an impurity from a bath of molten metal as a dross or crust, comprising cooling the surface of a body of a metal in a kettle by applying to said surface a cooling liquid and, simultaneously with said cooling, stirring the molten metal thereby to precipitate said impurity to form a solid crust in the form of a substantially unitary mass containing impurity precipitated by said cooling, said cooling liquid being applied to said surface such that an opening is present in said solid crust to permit insertion or withdrawal of a stirrer or pump into the molten metal below said solid crust.

2. A process according to claim 1 wherein the metal surface is cooled by applying said cooling liquid to an annular portion thereof, said annular portion being spaced from the periphery of the metal surface, said opening in said crust being located within said annular portion.

3. A process according to claim 1 or 2 wherein the cooling liquid is restricted to a portion of the metal surface by a frame or trough positioned adjacent said metal surface.

4. A process according to claim 3 wherein said frame or trough is floated on said surface.

5. A process according to claim 3 wherein said frame or trough is provided with radial ribs on its underside such that said stirring of said molten metal generates a flow pattern which, at said surface, is constrained by said ribs.

6. A process according to claim 1 or 2 wherein said cooling medium comprises water.

7. A process according to claim 1 or 2 wherein said metal comprises lead containing as an impurity at least one of silver, gold and copper, and wherein zinc is added to said lead prior to said cooling and stirring.

8. A process according to claim 1 further comprising removing molten metal from said kettle while retaining said solid crust within said kettle.

9. A process according to claim 8 wherein said crust is formed as a bridge in said kettle and wherein said molten metal is removed from below said bridge.

10. A method according to claim 8 or 9 further comprising the steps of, after removing said molten metal from said kettle:
providing a fresh charge of molten, impurity-containing metal in said kettle;
stirring the fresh molten metal charge to admix said solidified crust therewith;
maintaining the temperature of the admixture of solidified crust and fresh metal charge such that a rich crust is formed on the surface of said admixture, said rich crust containing said impurity; and
removing said rich crust from said kettle to provide a body of molten metal in said kettle.

11. A method according to claim 10 further comprising the steps of cooling the surface of the body of molten metal provided in said kettle by said removal of said rich crust from said kettle by applying to said surface a cooling liquid, and, simultaneously with said cooling, stirring the molten metal thereby to precipitate said impurity to form a further solid crust in the form of a substantially unitary mass containing impurity precipitated by said cooling.

12. A process according to claim 1, 2, 8 or 9 wherein said metal comprises tin containing iron as an impurity.

13. A process according to claim 10 wherein said metal comprises tin containing iron as an impurity, said process further comprising subjecting said rich crust to enrichment by high temperature centrifugation or liquation, and charging the enriched material to a smelting furnace for recovery of its tin content.

14. A process according to claim 1 wherein said cooling of said surface is carried out with substantially no cooling being effected through said kettle walls.

* * * * *